United States Patent
Hwang et al.

(10) Patent No.: US 8,688,316 B2
(45) Date of Patent: Apr. 1, 2014

(54) APPARATUS AND METHOD FOR COLLECTING VEHICLE DIAGNOSTIC INFORMATION

(75) Inventors: Hyun-Yong Hwang, Daejeon (KR); Tae-Man Han, Daejeon (KR); Jee-Sook Eun, Daejeon (KR); Chang-Gyu Lim, Daejeon (KR); Chang-Min Shin, Daejeon (KR); Seo-Hyun Jeon, Yongin-si (KR); Yang-Jae Jeong, Daejeon (KR); Jeong-Hwan Kim, Daejeon (KR); Mi-Ryong Park, Suwon-si (KR); Chul-Hong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 182 days.

(21) Appl. No.: 13/333,986

(22) Filed: Dec. 21, 2011

(65) Prior Publication Data
US 2012/0166040 A1      Jun. 28, 2012

(30) Foreign Application Priority Data
Dec. 23, 2010   (KR) .................. 10-2010-0133947

(51) Int. Cl.
*G01M 17/00* (2006.01)
(52) U.S. Cl.
USPC ........................................ 701/33.4; 701/33.7

(58) Field of Classification Search
USPC ............................................... 701/33.4, 33.7
See application file for complete search history.

(56) References Cited

U.S. PATENT DOCUMENTS

| | | | |
|---|---|---|---|
| 2004/0255202 A1* | 12/2004 | Wong et al. | 714/43 |
| 2005/0065805 A1* | 3/2005 | Moharram | 705/1 |
| 2007/0201874 A1 | 8/2007 | Kim | |
| 2008/0089693 A1* | 4/2008 | El-Ahmadi et al. | 398/135 |
| 2010/0021160 A1* | 1/2010 | Wakayama et al. | 398/45 |
| 2010/0235285 A1* | 9/2010 | Hoffberg | 705/75 |

FOREIGN PATENT DOCUMENTS

| | | |
|---|---|---|
| KR | 1020070082299 A | 8/2007 |
| KR | 1020100028254 A | 3/2010 |

* cited by examiner

*Primary Examiner* — Hussein A. Elchanti

(57) ABSTRACT

Disclosed herein are an apparatus and method for collecting vehicle diagnostic information. The apparatus for collecting vehicle diagnostic information includes a conversion unit and an optical multiplexing unit. The conversion unit receives a plurality of frames complying with respective different protocols from a plurality of networks for vehicles, which collects vehicle diagnostic information, in electric signal form, and converts the plurality of frames into a plurality of optical signals having respective different wavelengths based on the wavelengths previously assigned to the respective protocols. The optical multiplexing unit generates a wavelength division multiplexed signal by performing wavelength division multiplexing (WDM) on the plurality of optical signals, and transmits the wavelength division multiplexed signal via an optical cable.

9 Claims, 6 Drawing Sheets

APPARATUS AND METHOD FOR COLLECTING VEHICLE DIAGNOSTIC INFORMATION

CROSS REFERENCE TO RELATED APPLICATION

This application claims the benefit of Korean Patent Application No. 10-2010-0133947, filed on Dec. 23, 2010, which is hereby incorporated by reference in its entirety into this application.

BACKGROUND OF THE INVENTION

1. Technical Field

The present invention relates generally to an apparatus and method for collecting vehicle diagnostic information and, more particularly, to an apparatus and method for collecting vehicle diagnostic information using Wavelength Division Multiplexing (WDM).

2. Description of the Related Art

Networks for vehicles utilize various protocols depending on the characteristics of the vehicles. For example, networks for vehicles may utilize protocols for vehicles such as the Local Interconnect Network (LIN) protocol, the Controller Area Network (CAN) protocol, the FlexRay protocol, and the Media Oriented System Transport (MOST) protocol.

The LIN protocol is a low-cost serial communication protocol which is a distributed electronic system inside a vehicle. The LIN protocol can reduce expenses because it does not require the bandwidth and multi-functionality which are required by the CAN protocol.

The CAN protocol is an efficient serial communication protocol which supports distributed real-time control having a very high security level. The CAN protocol is being widely used as a communication protocol for the industry, particularly vehicles, thanks to advantages such as multi-master support, priority processing, and elaborate error detection.

The FlexRay protocol is a communication protocol which transfers data using fixed time slots. The FlexRay protocol assigns fixed time slots, which allow exclusive entry rights, to nodes which are connected to a bus. In accordance with the FlexRay protocol, the time at which data is on a bus can be accurately calculated, and entry into the bus can be predicted.

The MOST protocol is a communication protocol which is used for data transmission among the various types of multimedia devices of a vehicle. The MOST protocol is a communication protocol for vehicles, which generally forms a ring-type network and can transmit large amounts of multimedia information, such as audio and video, via optical fibers over a wide bandwidth and at high speed.

Meanwhile, when networks for vehicles support a variety of protocols for vehicles, there is the problem of interference occurring among the different protocols for vehicles.

SUMMARY OF THE INVENTION

Accordingly, the present invention has been made keeping in mind the above problems occurring in the prior art, and an object of the present invention is to provide an apparatus and method for collecting vehicle diagnostic information, which are capable of collecting diagnostic information about a vehicle over networks for vehicles, which support a variety of protocols for vehicles, without incurring interference among the different protocols for vehicles.

In order to accomplish the above object, the present invention provides an apparatus for collecting vehicle diagnostic information, including a conversion unit for receiving a plurality of frames complying with respective different protocols from a plurality of networks for vehicles, which collects vehicle diagnostic information, in electric signal form, and converting the plurality of frames into a plurality of optical signals having respective different wavelengths based on the wavelengths previously assigned to the respective protocols; and an optical multiplexing unit for generating a wavelength division multiplexed signal by performing wavelength division multiplexing (WDM) on the plurality of optical signals, and transmitting the wavelength division multiplexed signal via an optical cable.

In accordance with another aspect of the present invention, there is provided an apparatus for collecting vehicle diagnostic information, including an optical demultiplexing unit for generating a plurality of optical signals having respective different wavelengths by classifying a wavelength division multiplexed signal, received via an optical cable, by predetermined wavelengths; a conversion unit for generating a plurality of frames complying with respective different protocols for vehicles by converting the plurality of optical signals into electric signals; a frame processing unit for extracting vehicle diagnostic information from each of the plurality of frames using previously stored information about the protocols for vehicles; and an electrical multiplexing unit for collecting vehicle diagnostic information of the plurality of frames.

In accordance with still another aspect of the present invention, there is provided a method of collecting vehicle diagnostic information, including receiving a plurality of frames complying with respective different protocols from a plurality of networks for vehicles, which collects vehicle diagnostic information; generating a wavelength division multiplexed signal by performing WDM on the plurality of frames; and transmitting the wavelength division multiplexed signal via a single channel.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
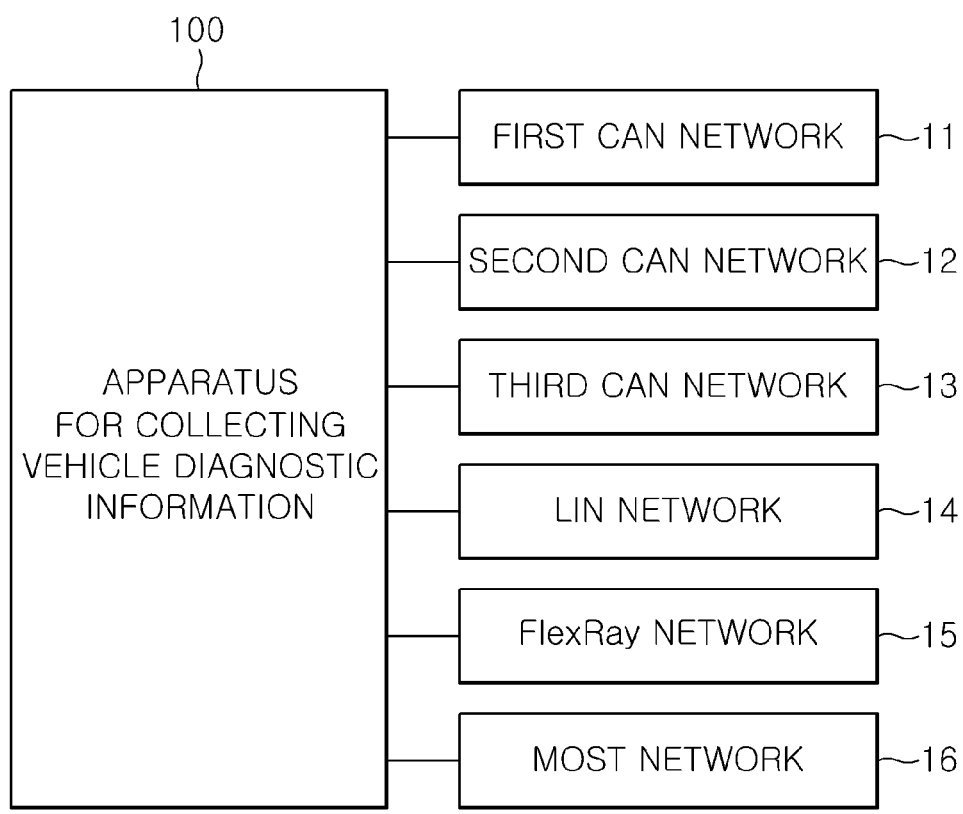
FIG. 1 is a diagram illustrating the configuration of an apparatus for collecting vehicle diagnostic information, which is connected to each of a plurality of networks.

Reference now should be made to the drawings, throughout which the same reference numerals are used to designate the same or similar components.

The present invention will be described in detail below with reference to the accompanying drawings. Repetitive descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

An apparatus and method for collecting vehicle diagnostic information according to embodiments of the present invention will be described in detail below.

First, referring to FIGS. 1 and 2, apparatuses 100 and 200 for collecting vehicle diagnostic information will be described.

FIG. 1 is a diagram illustrating the configuration of the apparatus 100 for collecting vehicle diagnostic information, which is directly connected to each of a plurality of networks.

As shown in FIG. 1, the apparatus 100 for collecting vehicle diagnostic information is directly connected to the plurality of networks for vehicles, that is, a first CAN network 11, a second CAN network 12, a third CAN network 13, a LIN network 14, a FlexRay network 15, and a MOST network 16.

The first CAN network 11 collects vehicle diagnostic information from an Electronic Control Unit (hereinafter referred to as the "ECU") constituting a part of the first CAN network 11, creates a first network frame including the collected vehicle diagnostic information in compliance with the CAN protocol, and transfers the created first network frame to the apparatus 100 for collecting vehicle diagnostic information.

The second CAN network 12 collects vehicle diagnostic information from an ECU constituting a part of the second CAN network 12, creates a second network frame including the collected vehicle diagnostic information in compliance with the CAN protocol, and transfers the created second network frame to the apparatus 100 for collecting vehicle diagnostic information.

The third CAN network 13 collects vehicle diagnostic information from an ECU constituting a part of the third CAN network 13, creates a third network frame including the collected vehicle diagnostic information in compliance with the CAN protocol, and transfers the created third network frame to the apparatus 100 for collecting vehicle diagnostic information.

The LIN network 14 collects vehicle diagnostic information from an ECU constituting a part of the LIN network 14, creates a fourth network frame including the collected vehicle diagnostic information in compliance with the LIN protocol, and transfers the created fourth network frame to the apparatus 100 for collecting vehicle diagnostic information.

The FlexRay network 15 collects vehicle diagnostic information from an ECU constituting a part of the FlexRay network 15, creates a fifth network frame including the collected vehicle diagnostic information in compliance with the FlexRay protocol, and transfers the created fifth network frame to the apparatus 100 for collecting vehicle diagnostic information.

The MOST network 16 collects vehicle diagnostic information from an ECU constituting a part of the MOST network 16, creates a sixth network frame including the collected vehicle diagnostic information in compliance with the MOST protocol, and transfers the created sixth network frame to the apparatus 100 for collecting vehicle diagnostic information.

When the apparatus 100 for collecting vehicle diagnostic information is directly connected to each of the networks for vehicles as described above, the apparatus 100 for collecting vehicle diagnostic information has the disadvantage of the connections being complicated relative to the number of the types of networks for vehicles, and also has the disadvantage of there being a limited number of ports which are supported by the apparatus 100 for collecting vehicle diagnostic information for respective protocols for vehicles.

Figure 2:
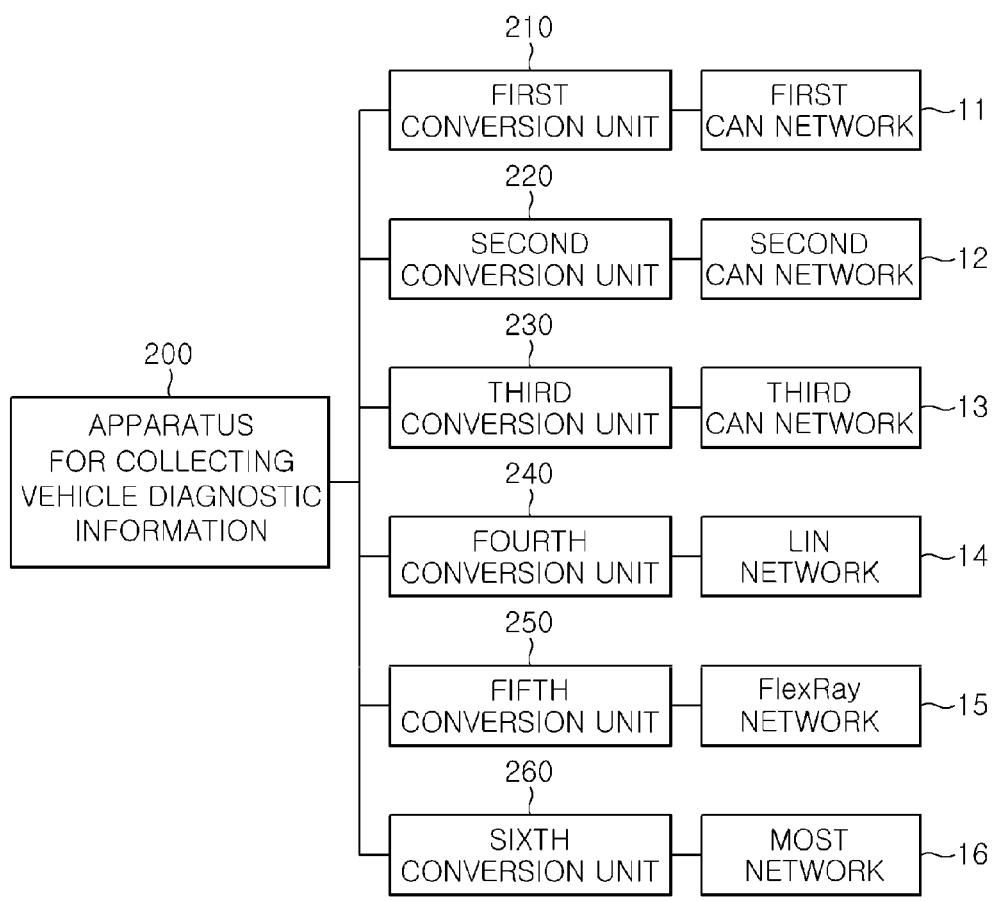
FIG. 2 is a diagram illustrating the configuration of an apparatus for collecting vehicle diagnostic information, which is connected to all networks via a single channel.

FIG. 2 is a diagram illustrating the configuration of the apparatus 200 for collecting vehicle diagnostic information, which is connected to all networks via a single channel.

As shown in FIG. 2, the apparatus 200 for collecting vehicle diagnostic information collects vehicle diagnostic information from a plurality of networks for vehicles via a plurality of frame conversion units connected thereto via a single channel. Here, the plurality of frame conversion units may include a first conversion unit 210, a second conversion unit 220, a third conversion unit 230, a fourth conversion unit 240, a fifth conversion unit 250, and a sixth conversion unit 260. Furthermore, the plurality of networks for vehicles may include a first CAN network 11, a second CAN network 12, a third CAN network 13, a LIN network 14, a FlexRay network 15, and a MOST network 16.

The first CAN network 11 collects vehicle diagnostic information from an ECU constituting a part of the first CAN network 11, creates a first CAN frame including the collected vehicle diagnostic information in compliance with the CAN protocol, and transfers the created first CAN frame to the first conversion unit 210.

The second CAN network 12 collects vehicle diagnostic information from an ECU constituting a part of the second CAN network 12, creates a second CAN frame including the collected vehicle diagnostic information in compliance with the CAN protocol, and transfers the created second CAN frame to the second conversion unit 220.

The third CAN network 13 collects vehicle diagnostic information from an ECU constituting a part of the third CAN network 13, creates a third CAN frame including the collected vehicle diagnostic information in compliance with the CAN protocol, and transfers the created third CAN frame to the third conversion unit 230.

The LIN network 14 collects vehicle diagnostic information from an ECU constituting a part of the LIN network 14, creates a LIN frame including the collected vehicle diagnostic information in compliance with the LIN protocol, and transfers the created LIN frame to the fourth conversion unit 240.

The FlexRay network 15 collects vehicle diagnostic information from an ECU constituting a part of the FlexRay network 15, creates a FlexRay frame including the collected vehicle diagnostic information in compliance with the FlexRay protocol, and transfers the created FlexRay frame to the fifth conversion unit 250.

The MOST network 16 collects vehicle diagnostic information from an ECU constituting a part of the MOST network 16, creates a MOST frame including the collected vehicle diagnostic information in compliance with the MOST protocol, and transfers the created MOST frame to the sixth conversion unit 260.

The plurality of frame conversion units receive the network frames from the plurality of networks for vehicles, convert the received network frames into frames in predetermined frame format, and transfer the resulting network frames to the apparatus 200 for collecting vehicle diagnostic information. Here, the plurality of frame conversion units may convert the received network frames into frames in a data frame format which complies with the CAN protocol.

For example, the first conversion unit 231 may receive the first CAN frame complying with the CAN protocol from the first CAN network 11, and, in turn, transfer the received first CAN frame to the apparatus 200 for collecting vehicle diagnostic information.

For example, the second conversion unit 232 may receive the second CAN frame complying with the CAN protocol from the second CAN network 12, and, in turn, transfer the received second CAN frame to the apparatus 200 for collecting vehicle diagnostic information.

For example, the third conversion unit 233 may receive the third CAN frame complying with the CAN protocol from the third CAN network 13, and, in turn, transfer the received third CAN frame to the apparatus 200 for collecting vehicle diagnostic information.

For example, the fourth conversion unit 234 may receive the LIN frame complying with the LIN protocol from the LIN network 14, converts the received LIN frame into a fourth CAN frame which complies with the CAN protocol, and transfer the resulting fourth CAN frame to the apparatus 200 for collecting vehicle diagnostic information.

For example, the fifth conversion unit 235 may receive the FlexRay frame complying with the FlexRay protocol from the FlexRay network 15, convert the received FlexRay frame into a fifth CAN frame which complies with the CAN protocol, and transfer the resulting fifth CAN frame to the apparatus 200 for collecting vehicle diagnostic information.

For example, the sixth conversion unit 236 may receive the MOST frame complying with the MOST protocol from the MOST network 16, convert the received MOST frame into a sixth CAN frame which complies with the CAN protocol, and transfer the resulting sixth CAN frame to the apparatus 200 for collecting vehicle diagnostic information.

The apparatus 200 for collecting vehicle diagnostic information receives the network frames from the plurality of frame conversion units, extracts vehicle diagnostic information from the received network frames, and stores and manages the extracted vehicle diagnostic information.

When the apparatus 200 for collecting vehicle diagnostic information is connected to the plurality of networks for vehicles via a single channel as described above, the apparatus 200 for collecting vehicle diagnostic information has the disadvantage of converting network frames, received from the networks for vehicles, into frames in the same format, and also has the disadvantage of adjusting the transfer speed which is employed to transfer diagnostic information over the networks for vehicles to the transfer speed which is employed to transfer diagnostic information over the single channel.

Next, referring to FIG. 3, an apparatus 300 for collecting vehicle diagnostic information according to an embodiment of the present invention will be described.

Figure 3:
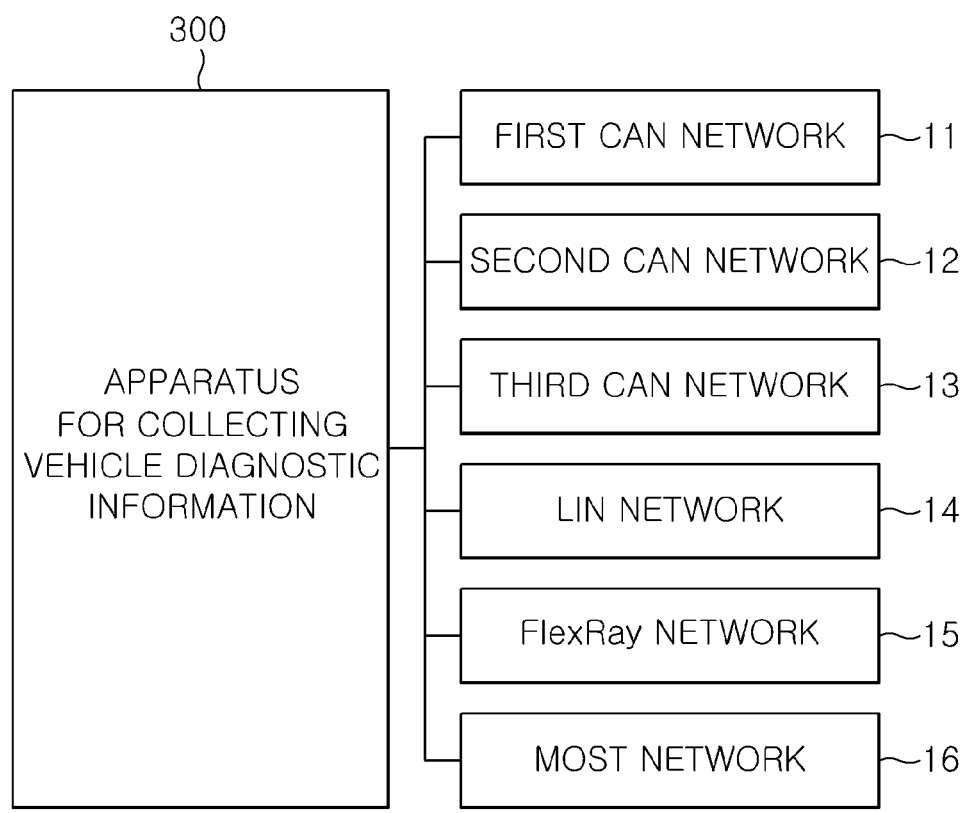
FIG. 3 is a diagram illustrating an apparatus for collecting vehicle diagnostic information according to an embodiment of the present invention.

FIG. 3 is a diagram illustrating the apparatus 300 for collecting vehicle diagnostic information according to an embodiment of the present invention.

As shown in FIG. 3, the apparatus 300 for collecting vehicle diagnostic information is connected to a plurality of networks for vehicles, that is, a first CAN network 11, a second CAN network 12, a third CAN network 13, a LIN network 14, a FlexRay network 15, and a MOST network 16.

The first CAN network 11 collects vehicle diagnostic information from an ECU constituting a part of the first CAN network 11, creates a first network frame including collected vehicle diagnostic information in compliance with the CAN protocol, and transfers the created first network frame to the apparatus 300 for collecting vehicle diagnostic information.

The second CAN network 12 collects vehicle diagnostic information from an ECU constituting a part of the second CAN network 12, creates a second network frame including collected vehicle diagnostic information in compliance with the CAN protocol, and transfers the created second network frame to the apparatus 300 for collecting vehicle diagnostic information.

The third CAN network 13 collects vehicle diagnostic information from an ECU constituting a part of the third CAN network 13, creates a third network frame including collected vehicle diagnostic information in compliance with the CAN protocol, and transfers the created third network frame to the apparatus 300 for collecting vehicle diagnostic information.

The LIN network 14 collects vehicle diagnostic information from an ECU constituting a part of the LIN network 14, creates a fourth network frame including the collected vehicle diagnostic information in compliance with the LIN protocol, and transfers the created fourth network frame to the apparatus 300 for collecting vehicle diagnostic information.

The FlexRay network 15 collects vehicle diagnostic information from an ECU constituting a part of the FlexRay network 15, creates a fifth network frame including the collected vehicle diagnostic information in compliance with the FlexRay protocol, and transfers the created fifth network frame to the apparatus 300 for collecting vehicle diagnostic information.

The MOST network 16 collects vehicle diagnostic information from an ECU constituting a part of the MOST network 16, creates a sixth network frame including the collected vehicle diagnostic information in compliance with the MOST protocol, and transfers the created sixth network frame to the apparatus 300 for collecting vehicle diagnostic information.

The apparatus 300 for collecting vehicle diagnostic information receives the created network frames from the networks for vehicles via a single channel using Wavelength Division Multiplexing (hereinafter referred to as a "WDM") technology.

Next, referred to FIG. 4, the components of the apparatus 300 for collecting vehicle diagnostic information according to an embodiment of the present invention will be described.

Figure 4:
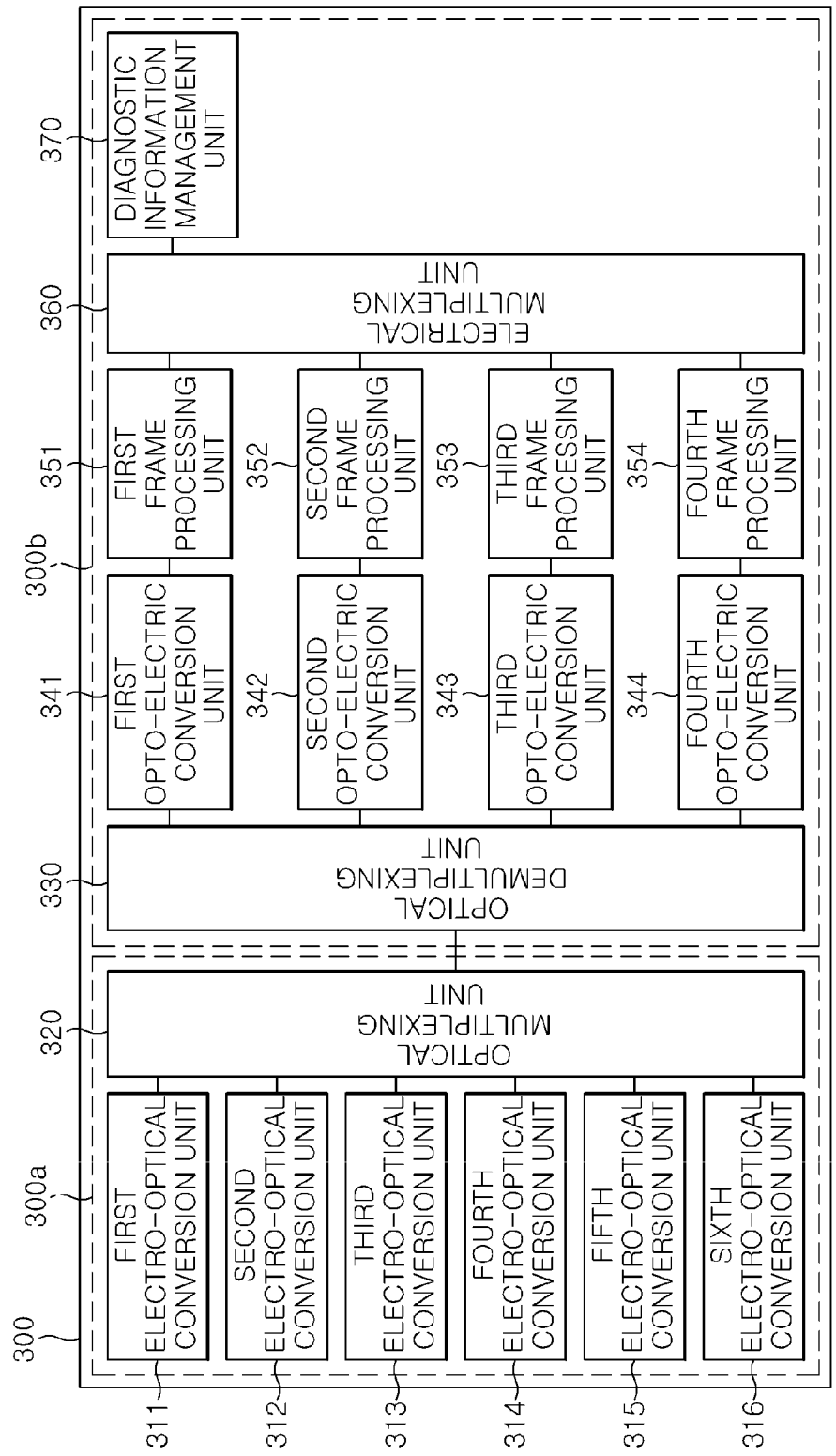
FIG. 4 is a diagram illustrating the components of the apparatus for collecting vehicle diagnostic information according to an embodiment of the present invention.

FIG. 4 is a diagram illustrating the components of the apparatus 300 for collecting vehicle diagnostic information according to an embodiment of the present invention.

As shown in FIG. 4, the apparatus 300 for collecting vehicle diagnostic information includes a plurality of electro-optical conversion units, an optical multiplexing unit 320, an optical demultiplexing unit 330, a plurality of opto-electric conversion units, a plurality of frame processing units, an electrical multiplexing unit 360, and a diagnostic information management unit 370. Here, the plurality of electro-optical conversion units and the optical multiplexing unit 320 correspond to a transmission unit 300$a$, and the optical demultiplexing unit 330, the plurality of opto-electric conversion units, the plurality of frame processing units, the electrical multiplexing unit 360 and the diagnostic information management unit 370 correspond to a reception unit 300$b$. Furthermore, the transmission unit 300$a$ and the reception unit 300$b$ may be connected to each other via an optical cable.

The plurality of electro-optical conversion units receives the plurality of network frames complying with different protocols for vehicles from the plurality of networks for vehicles in the form of electric signals, converts the plurality of received network frames into a plurality of optical signals having different wavelengths by converting the electric signals into the optical signals at the wavelengths assigned to the respective protocols for vehicles, and transfer the plurality of optical signals to the optical multiplexing unit 320. Here, the electrooptical conversion units may include a first electro-optical conversion unit 311, a second electrooptical conversion unit 312, a third electro-optical conversion unit 313, a fourth electro-optical conversion unit 314, a fifth electro-optical conversion unit 315, and a sixth electro-optical conversion unit 316.

Here, a first wavelength $\lambda_1$ is assigned to the CAN protocol, a second wavelength $\lambda_2$ is assigned to the LIN protocol, a third wavelength $\lambda_3$ is assigned to the FlexRay protocol, and a fourth wavelength $\lambda_4$ is assigned to the MOST protocol.

For example, the first electro-optical conversion unit 311 receives the first network frame complying with the CAN protocol from the first CAN network 11, and converts the received first network frame into an optical signal having the first wavelength $\lambda_1$.

For example, the second electro-optical conversion unit 312 may receive a second network frame complying with the CAN protocol from the second CAN network 12, and convert the received second network frame into an optical signal having the first wavelength $\lambda_1$.

For example, the third electro-optical conversion unit 313 may receive a third network frame complying with the CAN protocol from the third CAN network 13, and convert the received third network frame into an optical signal having the first wavelength $\lambda_1$.

For example, the fourth electro-optical conversion unit 314 may receive a fourth network frame complying with the LIN protocol from the LIN network 14, and convert the received fourth network frame into an optical signal having the second wavelength $\lambda_2$.

For example, the fifth electro-optical conversion unit 315 may receive a fifth network frame complying with the FlexRay protocol from the FlexRay network 15, and convert the received fifth network frame into an optical signal having the third wavelength $\lambda_3$.

For example, the sixth electro-optical conversion unit 316 may receive a sixth network frame complying with the MOST protocol from the MOST network 16, and convert the received sixth network frame into an optical signal having the fourth wavelength $\lambda_4$.

The optical multiplexing unit 320 receives the optical signals having different wavelengths from the electro-optical conversion units, generates an optically multiplexed signal by performing WDM on the plurality of received optical signals, and transfers the generated optically multiplexed signal to the optical demultiplexing unit 330 via a single channel. Here, the optical multiplexing unit 320 may transfer the optically multiplexed signal to the optical demultiplexing unit 330 via an optical cable. In this case, the optically multiplexed signal corresponds to a wavelength division multiplexed signal.

For example, the optical multiplexing unit 320 may generate the optically multiplexed signal by optically multiplexing the optical signal having the first wavelength $\lambda_1$, the optical signal having the second wavelength $\lambda_2$, the optical signal having the third wavelength $\lambda_3$, and the optical signal having the fourth wavelength $\lambda_4$.

The optical demultiplexing unit 330 receives the optically multiplexed signal from the optical multiplexing unit 320 via a single channel, generates a plurality of optical demultiplexed signals having different wavelengths by classifying the received optically multiplexed signal by predetermined wavelengths, and transfers the plurality of generated optical demultiplexed signals to the plurality of opto-electric conversion units. Here, the optical demultiplexing unit 330 may receive the optically multiplexed signal via an optical cable. In this case, the optically multiplexed signal corresponds to a wavelength division multiplexed signal.

For example, the optical demultiplexing unit 330 may generate the optical demultiplexed signal having the first wavelength $\lambda_1$ the optical demultiplexed signal having the second wavelength $\lambda_2$, the optical demultiplexed signal having the third wavelength $\lambda_3$, and the optical demultiplexed signal having the fourth wavelength $\lambda_4$ from the optically multiplexed signal received from the optical multiplexing unit 320.

The plurality of opto-electric conversion units receive a plurality of optical demultiplexed signals having different wavelengths from the optical demultiplexing unit 330, generate a plurality of data frames complying with different protocols by converting the plurality of received optical demultiplexed signals from optical signals into electric signals, and transfer the plurality of generated data frames to the plurality of frame processing units, respectively. Here, the plurality of opto-electric conversion units may include a first opto-electric conversion unit 341, a second opto-electric conversion unit 342, a third opto-electric conversion unit 343, and a fourth opto-electric conversion unit 344.

Here, each of the plurality of opto-electric conversion units may generate a data frame complying with a protocol for vehicles corresponding to the wavelength of a relevant received optical demultiplexed signal by converting the received optical demultiplexed signal from an optical signal into an electric signal.

For example, the first opto-electric conversion unit 341 may generate a data frame, that is, a CAN frame, complying with the CAN protocol corresponding to the first wavelength $\lambda_1$ by converting the optical demultiplexed signal having the first wavelength $\lambda_1$ from an optical signal into an electric signal.

For example, the second opto-electric conversion unit 342 may generate a data frame, that is, a LIN frame, complying with the LIN protocol corresponding to the second wavelength $\lambda_2$ by converting the optical demultiplexed signal having the second wavelength $\lambda_2$ from an optical signal into an electric signal.

For example, third opto-electric conversion unit 343 may generate a data frame, that is, a FlexRay frame, complying with the FlexRay protocol corresponding to the third wavelength $\lambda_3$ by converting the optical demultiplexed signal having the third wavelength $\lambda_3$ from an optical signal into an electric signal.

For example, the fourth opto-electric conversion unit 344 may generate a data frame, that is, a MOST frame, complying with the MOST protocol corresponding to the fourth wavelength $\lambda_4$ by converting the optical demultiplexed signal having the fourth wavelength $\lambda_4$ from an optical signal into an electric signal.

The plurality of frame processing units receive the plurality of data frames complying with the respective different protocols for vehicles from the plurality of opto-electric conversion units, extract vehicle diagnostic information from the plurality of received data frames using previously stored information about the protocols for vehicles, and transfer the extracted vehicle diagnostic information to the electrical multiplexing unit 360. Here, the plurality of frame processing units may include a first frame processing unit 351, a second frame processing unit 352, a third frame processing unit 353, and a fourth frame processing unit 354. Here, the information about the protocols for vehicles may include the frame structure information of each of the plurality of protocols for vehicles.

Here, each of the plurality of frame processing units may extract vehicle diagnostic information from a relevant received data frame in compliance with the protocol for vehicles of the received data frame.

For example, the first frame processing unit 351 may receive a CAN frame complying with the CAN protocol from the first opto-electric conversion unit 341, and extract vehicle diagnostic information from the received CAN frame.

For example, the second frame processing unit 352 may receive a LIN frame complying with the LIN protocol from the second opto-electric conversion unit 342, and extract vehicle diagnostic information from the received LIN frame.

For example, the third frame processing unit 353 may receive a FlexRay frame complying with the FlexRay protocol from the third opto-electric conversion unit 343, and extract vehicle diagnostic information from the received FlexRay frame.

For example, the fourth frame processing unit 354 may receive a MOST frame complying with the MOST protocol from the fourth opto-electric conversion unit 344, and extract vehicle diagnostic information from the received MOST frame.

The electrical multiplexing unit 360 receives the vehicle diagnostic information from the plurality of frame processing units, and transfers the received vehicle diagnostic information to the diagnostic information management unit 370. Here, the electrical multiplexing unit 360 functions to collect vehicle diagnostic information from the plurality of frame processing units.

The diagnostic information management unit 370 receives the vehicle diagnostic information from the electrical multiplexing unit 360, and stores and manages the received vehicle diagnostic information.

Next, referring to FIGS. 5 and 6, a method of collecting vehicle diagnostic information according to an embodiment of the present invention will be described.

Figure 5:
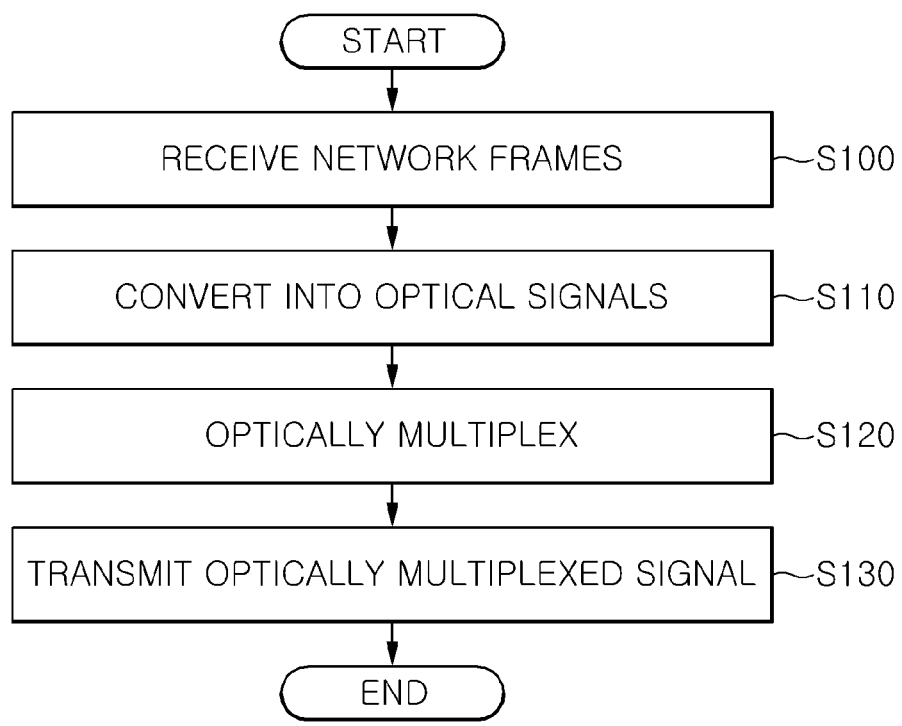
FIG. 5 is a flowchart illustrating a method of transmitting vehicle diagnostic information according to an embodiment of the present invention.

FIG. 5 is a flowchart illustrating a method of transmitting vehicle diagnostic information according to an embodiment of the present invention.

As shown in FIG. 5, first, the transmission unit 300a of the apparatus 300 for collecting vehicle diagnostic information receives a plurality of network frames complying with respective different protocols for vehicles from a plurality of networks for vehicles at step S100. Here, the plurality of received network frames corresponds to electric signals.

Thereafter, the transmission unit 300a of the apparatus 300 for collecting vehicle diagnostic information generates optical signals having respective different wavelengths by converting the plurality of received network frames into respective optical signals respectively having wavelengths previously assigned to respective protocols for vehicles at step S110.

Thereafter, the transmission unit 300a of the apparatus 300 for collecting vehicle diagnostic information generates an optically multiplexed signal by performing WDM on the optical signals at step S120. Here, the optically multiplexed signal may correspond to a wavelength division multiplexed signal.

Thereafter, the transmission unit 300a of the apparatus 300 for collecting vehicle diagnostic information transmits the generated optically multiplexed signal to the reception unit 300b of the apparatus 300 for collecting vehicle diagnostic information via a single channel at step S130. Here, the transmission unit 300a of the apparatus 300 for collecting vehicle diagnostic information may transmit the optically multiplexed signal to the reception unit 300b of the apparatus 300 for collecting vehicle diagnostic information via an optical cable.

Figure 6:
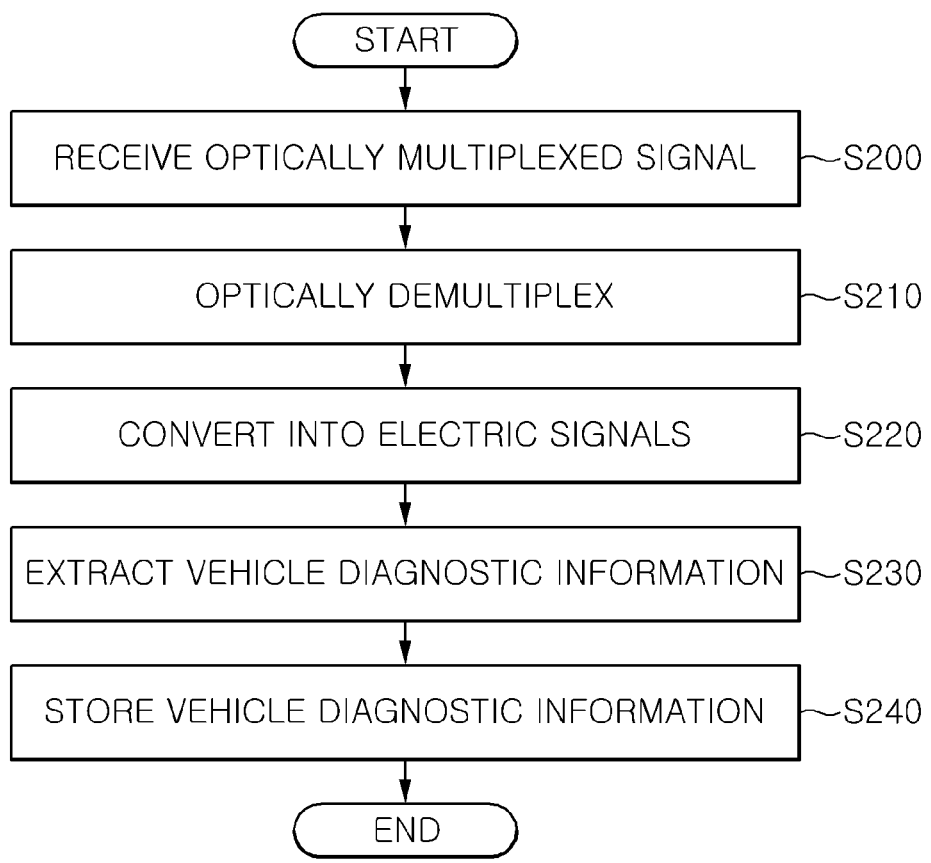
FIG. 6 is a flowchart illustrating a method of receiving vehicle diagnostic information according to an embodiment of the present invention.

FIG. 6 is a flowchart illustrating a method of receiving vehicle diagnostic information according to an embodiment of the present invention.

As shown in FIG. 6, first, the reception unit 300b of the apparatus 300 for collecting vehicle diagnostic information receives the optically multiplexed signal from the transmission unit 300a of the apparatus 300 for collecting vehicle diagnostic information via a single channel at step S200. Here, the reception unit 300b of the apparatus 300 for collecting vehicle diagnostic information may receive the optically multiplexed signal from the transmission unit 300a of the apparatus 300 for collecting vehicle diagnostic information via an optical cable. In this case, the optically multiplexed signal may correspond to a wavelength division multiplexed signal.

Thereafter, the reception unit 300b of the apparatus 300 for collecting vehicle diagnostic information generates a plurality of optical demultiplexed signals having respective different wavelengths by optically demultiplexing the received optically multiplexed signal at step S210.

Thereafter, the apparatus 300 for collecting vehicle diagnostic information generates data frames complying with respective different protocols for vehicles by converting the plurality of optical demultiplexed signals into respective electric signals at step S220.

Thereafter, the apparatus 300 for collecting vehicle diagnostic information extracts vehicle diagnostic information from each of the plurality of generated data frames at step S230.

Finally, the apparatus 300 for collecting vehicle diagnostic information stores the extracted vehicle diagnostic information at step S240.

The apparatus and method for collecting vehicle diagnostic information according to the present invention have the advantage of receiving vehicle diagnostic information, collected from different networks from vehicles, using the WDM technology, and therefore preventing interference among protocols for vehicles even when using a single channel, thereby effectively collecting vehicle diagnostic information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for collecting vehicle diagnostic information, comprising:
   a conversion unit for receiving a plurality of frames complying with respective different protocols from a plurality of networks for vehicles in electric signal form, the networks used for collecting vehicle diagnostic information, and converting the plurality of frames into a plurality of optical signals having respective different wavelengths; and
   an optical multiplexing unit for generating a wavelength division multiplexed signal by performing wavelength division multiplexing (WDM) on the plurality of optical signals, and transmitting the wavelength division multiplexed signal via an optical cable.

2. The apparatus of claim 1, wherein the conversion unit converts the plurality of frames into the plurality of optical signals based on the wavelengths previously assigned to the respective protocols.

3. The apparatus of claim 1, wherein each of the plurality of frames complies with any one of a Local Interconnect Network (LIN) protocol, a Controller Area Network (CAN) protocol, a FlexRay protocol, and a Media Oriented System Transport (MOST) protocol.

4. A method of collecting vehicle diagnostic information, comprising:

receiving a plurality of frames complying with respective different protocols from a plurality of networks for vehicles, which collects vehicle diagnostic information;

generating a wavelength division multiplexed signal by performing wavelength division multiplexing (WDM) on the plurality of frames; and transmitting the wavelength division multiplexed signal via a single channel.

5. The method of claim 4, wherein the generating comprises:

generating a plurality of optical signals having respective different wavelengths by converting the plurality of frames from electric signals into the optical signals based on the wavelengths previously assigned to the respective protocols; and generating the wavelength division multiplexed signal by optically multiplexing the plurality of optical signals.

6. The method of claim 4, wherein the networks for vehicles comply with the respective different protocols for vehicles.

7. The method of claim 4, wherein the transmitting comprises transmitting the wavelength division multiplexed signal for extracting the vehicle diagnostic information from the wavelength division multiplexed signal.

8. The method of claim 7, wherein the transmitting comprises transmitting the wavelength division multiplexed signal for extracting the vehicle diagnostic information from the plurality of frames generated by optically demultiplexing the wavelength division multiplexed signal.

9. The method of claim 7, wherein the transmitting comprises transmitting the wavelength division multiplexed signal for extracting the vehicle diagnostic information from the plurality of optical signals generated by classifying the wavelength division multiplexed signal by respective predetermined wavelengths.

* * * * *